(12) United States Patent
Su et al.

(10) Patent No.: US 9,172,419 B2
(45) Date of Patent: Oct. 27, 2015

(54) PROTECTING DEVICE FOR TABLET COMPUTER

(71) Applicant: Primax Electronics Ltd., Neihu, Taipei (TW)

(72) Inventors: Chun-Nan Su, Taipei (TW); Chun-Che Wu, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 14 days.

(21) Appl. No.: 14/300,993

(22) Filed: Jun. 10, 2014

(65) Prior Publication Data

US 2015/0236744 A1    Aug. 20, 2015

(30) Foreign Application Priority Data

Feb. 14, 2014    (TW) .............................. 103104955 A

(51) Int. Cl.
| | |
|---|---|
| H04M 1/00 | (2006.01) |
| H04B 1/3888 | (2015.01) |
| G06F 3/02 | (2006.01) |
| H04B 1/3877 | (2015.01) |
| H04M 1/725 | (2006.01) |

(52) U.S. Cl.
CPC ............ *H04B 1/3888* (2013.01); *G06F 3/0221* (2013.01); *H04B 1/3877* (2013.01); *H04M 1/7253* (2013.01)

(58) Field of Classification Search
CPC . H04B 1/3888; H04M 1/0214; G06F 1/1626; H01H 13/701

USPC .................. 455/575.8, 575.1, 556.2; 200/512
See application file for complete search history.

(56) References Cited

U.S. PATENT DOCUMENTS

| | | | | |
|---|---|---|---|---|
| 4,977,397 | A * | 12/1990 | Kuo et al. ...................... 345/163 |
| 6,350,137 | B1 * | 2/2002 | Shimada ........................ 439/266 |
| 2007/0158173 | A1 * | 7/2007 | Barnado ........................ 200/512 |
| 2009/0301848 | A1 * | 12/2009 | Huang ........................... 200/292 |
| 2010/0039298 | A1 * | 2/2010 | Yang et al. ...................... 341/22 |
| 2010/0163289 | A1 * | 7/2010 | Ito et al. ......................... 174/259 |
| 2011/0089004 | A1 * | 4/2011 | Yanai et al. .................... 200/275 |
| 2012/0318656 | A1 * | 12/2012 | Chen .............................. 200/517 |
| 2014/0118971 | A1 * | 5/2014 | Zhu et al. ....................... 361/757 |
| 2014/0166454 | A1 * | 6/2014 | Chen ............................. 200/5 A |
| 2014/0284193 | A1 * | 9/2014 | Chou ............................ 200/5 A |
| 2015/0029623 | A1 * | 1/2015 | Yang et al. ....................... 361/56 |

* cited by examiner

*Primary Examiner* — Danh Le

(74) *Attorney, Agent, or Firm* — Kirton McConkie; Evan R. Witt

(57) ABSTRACT

A protecting device with keys' functions is provided. The protecting device includes a triggering member, a printed circuit board, and plural curable resinic structures. The printed circuit board includes plural first contacts. The plural first contacts are disposed on a top surface of the printed circuit board. The triggering member is disposed over the printed circuit board. The triggering member includes plural second contacts. The plural curable resinic structures are arranged between the triggering member and the printed circuit board for separating the plural first contacts and the plural second contacts from each other. Since the triggering member, the printed circuit board and the plural curable resinic structures of the protecting device of the present invention may replace the keys and the membrane switch circuit module of the conventional keyboard device, the thickness of the protecting device is largely reduced.

11 Claims, 10 Drawing Sheets

PROTECTING DEVICE FOR TABLET COMPUTER

FIELD OF THE INVENTION

The present invention relates to a protecting device, and more particularly to a protecting device for a tablet computer.

BACKGROUND OF THE INVENTION

With increasing development of science and technology, a tablet computer has been introduced into the market. The tablet computer has a slim appearance similar to the exterior shape of a LCD screen. Moreover, the screen of the tablet computer is a touch screen. Through the touch screen, the user may input an instruction into the tablet computer to control operations of the tablet computer. Generally, when the user intends to input a character or a symbol into the tablet computer, an on-screen keyboard is enabled and shown on the touch screen of the tablet computer. The on-screen keyboard is a virtual keyboard simulating the real keyboard device. By touching an icon of the on-screen keyboard, a corresponding character or symbol is inputted into the tablet computer. In other words, characters or symbols may be directly inputted into the tablet computer through the on-screen keyboard without the need of using any external keyboard device.

Since the tablet computer is equipped with the touch screen, if the touch screen is damaged, the operations of the tablet computer fail to be normally handled. That is, it is very important to impart protectiveness to the touch screen. For protecting the tablet computer, a protecting device for the tablet computer is introduced into the market. FIG. 1 is a schematic perspective view illustrating a conventional protecting device for a tablet computer, in which the protecting device is in a usage status. The protecting device 1 is used for storing the tablet computer 2 therein in order to protect the tablet computer 2 and a screen 20 of the personal computer 2. As shown in FIG. 1, the protecting device 1 comprises a base 10 and an upper cover 11. The base 10 has a fixing hook 101. In case that the tablet computer 2 is placed on the base 10, the tablet computer 2 may be fixed on the base 10 through the fixing hook 101. The upper cover 11 is connected with the base 10 and rotatable relative to the base 10. In case that the upper cover 11 is rotated relative to the base 10 to define an included angle A between the upper cover 11 and the base 10, the tablet computer 2 that is fixed on the base 10 may be operated by the user (see FIG. 1). Whereas, in case that the upper cover 11 is rotated relative to the base 10 to cover the base 10, the tablet computer 2 that is fixed on the base 10 may be covered and protected by the upper cover 11 (see FIG. 2).

Although the tablet computer 2 is easily carried because it has the slim appearance and no external keyboard device is needed, there are still some drawbacks. For example, the use of the touch screen to input characters or symbols becomes hindrance for most users who are familiar with the general personal computers or notebook computers. Consequently, in many circumstances, an external keyboard device is additionally prepared and connected to the tablet computer 2. In addition, the tablet computer 2 is placed and supported on a bookshelf or any other appropriate prop stand that can support the tablet computer 2. That is, the touch screen 20 of the tablet computer 2 is usually considered as a general display screen, and the external keyboard device is used for inputting characters or symbols. Generally, the external keyboard device is connected with the tablet computer 2 through a universal serial bus (USB). Alternatively, the external keyboard device may be in communication with the tablet computer 2 through a wireless transmission module by a wireless transmission technology.

Although the external keyboard device may facilitate the user to operate the tablet computer according the usual practice of the user, there are still some drawbacks. For example, the external keyboard device and the tablet computer need to be simultaneously carried. If the external keyboard device is not simultaneously carried with the tablet computer, the user has no choice but to input characters or symbols through the on-touch keyboard of the touch screen. From the above discussions, if the user intends to operate the tablet computer according to the usual practice, the external keyboard device should be additionally carried.

Hereinafter, the structure of a conventional external keyboard device will be illustrated with reference to FIG. 3. FIG. 3 is a schematic exploded view illustrating the structure of a conventional external keyboard device. As shown in FIG. 3, the conventional external keyboard device 3 comprises plural keys 30, a supporting plate 31, a membrane switch circuit module 32, a main circuit board 33, and a base 34. For clarification and brevity, only one key 30 is shown in the drawing. Each key 30 comprises a keycap 301, a scissors-type connecting element 302, and an elastic element 303. The supporting plate 31 comprises plural supporting plate openings 311 corresponding to respective keys 30. For clarification and brevity, only one supporting plate opening 311 is shown in the drawing. The membrane switch circuit module 32 comprises an upper wiring board 321, a spacer layer 322 and a lower wiring board 323. From top to bottom, the keycap 301, the scissors-type connecting element 302, the elastic element 303, the supporting plate 31, the upper wiring board 321, the spacer layer 322, the lower wiring board 323 and the base 34 of the conventional external keyboard device 3 are sequentially shown. The main circuit board 33 is located at a side of the membrane switch circuit module 32. The upper wiring board 321 has plural upper contacts 3211 corresponding to the plural keycaps 301. The lower wiring board 323 comprises plural lower contacts 3231 corresponding to the plural upper contacts 3211. Moreover, the spacer layer 322 comprises plural perforations (not shown) corresponding to the plural upper contacts 3211.

Moreover, the conventional external keyboard device 3 further comprises a top housing (not shown). The top housing comprises plural top housing openings corresponding to the plural keycaps 301. The plural keycaps 301 are penetrated through the plural keycaps 301, the plural scissors-type connecting elements 302 and the plural elastic elements 303, so that the supporting plate 31 is covered by the top housing. Due to the structures of the plural keycaps 301, the plural scissors-type connecting elements 302 and the plural elastic elements 303, the plural keycaps 301 are exposed outside a top surface of the conventional external keyboard device 3 (i.e. a top surface of the top housing) to be depressed by the user. Generally, the altitudes of the top surfaces of the plural keycaps 301 are higher than the top surface of the conventional external keyboard device 3. In other words, the keycap 301 has the raised appearance similar to the keycap of the general key.

When one of the keycaps 301 is depressed by the user, in response to the depressing force provided by the user, the keycap 301 is moved downwardly. As the keycap 301 is moved downwardly, the corresponding scissors-type connecting element 302 is swung. Since the corresponding elastic element 303 is pushed by the keycap 301, the corresponding elastic element 303 is subjected to deformation. Under this circumstance, the deformed elastic element 301 is penetrated through the corresponding supporting plate opening 311 to press the corresponding upper contact 3211, and the upper contact 3211 is penetrated through the corresponding perforation to be contacted with the corresponding lower contact 3231. Consequently, a corresponding key signal is generated. The key signal is transmitted to the main circuit board 33, and then transmitted to a computer host (not shown), which is in communication with the conventional external keyboard device 3. According to the key signal, the computer host executes an instruction corresponding to the depressed key.

However, the way of simultaneously carrying the external keyboard device and the tablet computer is inconvenient to the user. If the user does not intend to additionally carry the external keyboard device, the user needs to directly input characters or symbols through the on-touch keyboard of the touch screen The above two approaches, however, are not user-friendly.

For solving the above drawbacks, a protecting device with a keyboard device is introduced into the market. The protecting device comprises a base and an upper cover. The keyboard device is disposed on the base. The keyboard device comprises plural keys. The upper cover is connected with the base for fixing the tablet computer thereon. In other words, the conventional external keyboard device 3 is disposed on the base. Consequently, the keyboard device for the tablet computer may be operated by the user according to the usual practice. Moreover, since the tablet computer is fixed on the upper cover, the tablet computer may be operated more easily.

However, when the protecting device with the keyboard device is in a storage status, the tablet computer and the keyboard are stacked on each other. Under this circumstance, the overall thickness of the protecting device with the keyboard device is equal to the sum of the thickness of the tablet computer, the thickness of the keyboard device and the thickness of the protecting device. Since the overall thickness is too large, the protecting device in the storage status is difficult to be carried. Generally, the thickness of the keyboard is in the range between 4 mm and 6 mm.

Therefore, there is a need of providing a slim protecting device with keys' functions in order to eliminate the above drawbacks.

SUMMARY OF THE INVENTION

An object of the present invention provides a slim protecting device with keys' functions.

In accordance with an aspect of the present invention, there is provided a protecting device with keys' functions. The protecting device is in communication with a tablet computer. The tablet computer is storable within the protecting device. The protecting device includes a printed circuit board and a triggering member. The printed circuit board is disposed over the base. The printed circuit board includes plural first contacts. The plural first contacts are disposed on a top surface of the printed circuit board. The triggering member is disposed over the printed circuit board and exposed to an inner surface of the protecting device. The triggering member and the plural first contacts of the printed circuit board collaboratively generate plural key signals. The triggering member includes a superficial contact layer, a first plastic film layer, a conductive wiring layer, and plural curable resinic structures. The superficial contact layer is exposed to the inner surface of the protecting device, and includes plural contact regions. The plural contact regions are disposed over the corresponding first contacts, respectively. The first plastic film layer is disposed on a bottom surface of the superficial contact layer. The conductive wiring layer is disposed on a bottom surface of the first plastic film layer, and includes plural second contacts. The plural second contacts are aligned with the plural contact regions, respectively. The plural curable resinic structures are arranged between the first plastic film layer and the printed circuit board. Each of the plural curable resinic structures is arranged between two adjacent second contacts. The plural first contacts and the plural second contacts are separated from each other by the plural curable resinic structures. When one of the plural contact regions is depressed, the second contact corresponding to the depressed contact region is inserted into a space between the two adjacent curable resinic structures and contacted with the corresponding first contact, so that the corresponding key signal is generated and transmitted to the tablet computer.

In accordance with an aspect of the present invention, there is provided a protecting device with keys' functions. The protecting device is in communication with a tablet computer. The tablet computer is storable within the protecting device. The protecting device includes a printed circuit board and a triggering member. The printed circuit board is disposed over the base. The printed circuit board includes plural first contacts. The plural first contacts are disposed on a top surface of the printed circuit board. The triggering member is disposed over the printed circuit board and exposed to an inner surface of the protecting device. The triggering member is disposed over the printed circuit board and exposed to an inner surface of the protecting device. The triggering member and the plural first contacts of the printed circuit board collaboratively generate plural key signals. The triggering member includes a superficial contact layer, a conductive wiring layer, and a first plastic film layer. The superficial contact layer is exposed to the inner surface of the protecting device, and includes plural contact regions. The plural contact regions are disposed over the corresponding first contacts, respectively. The conductive wiring layer is disposed on a bottom surface of the superficial contact layer, and includes plural second contacts. The plural second contacts are aligned with the plural contact regions, respectively. The first plastic film layer is arranged between the superficial contact layer, and located beside the plural second contacts. The first plastic film layer includes plural perforations corresponding to respective first contacts. The plural first contacts and the plural second contacts are separated from each other by the first plastic film layer. When one of the plural contact regions is depressed, the second contact corresponding to the depressed contact region is inserted into the corresponding perforation and contacted with the corresponding first contact, so that the corresponding key signal is generated and transmitted to the tablet computer.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

For solving the drawbacks of the conventional technology, the present invention provides a protecting device with keys' functions.

Figure 1:
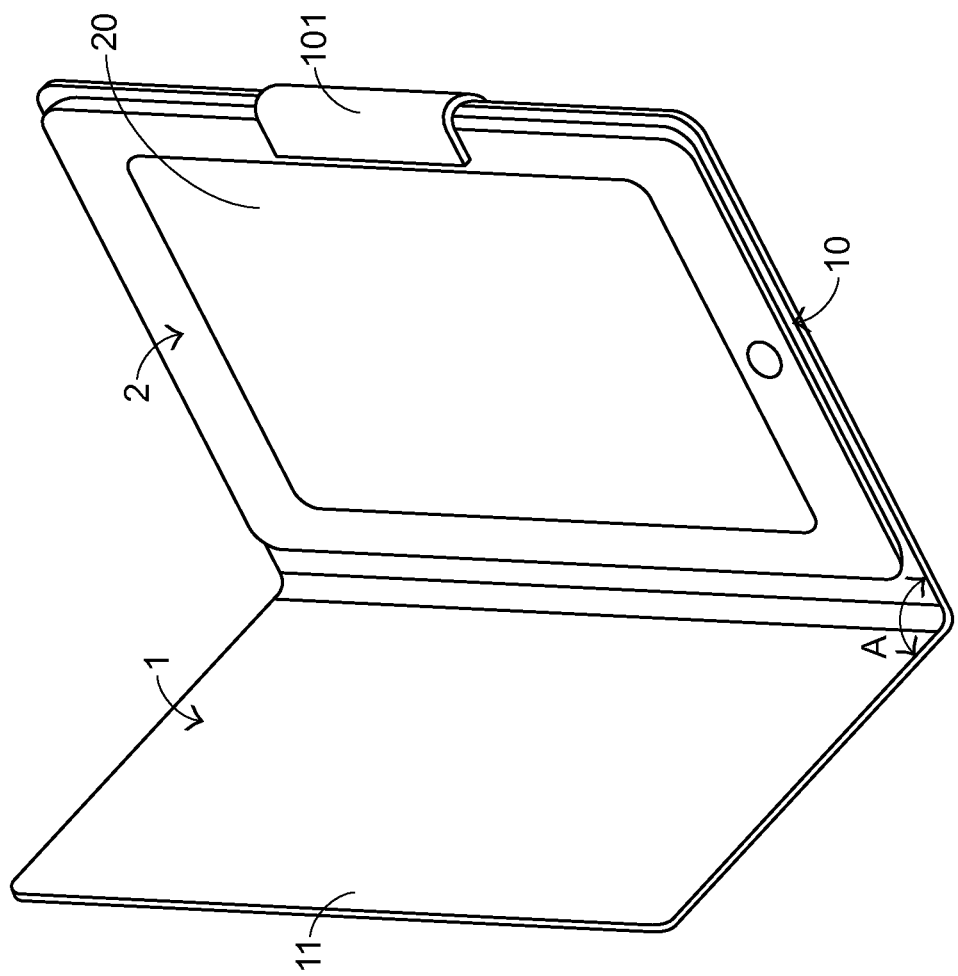
FIG. 1 is a schematic perspective view illustrating a conventional protecting device for a tablet computer, in which the protecting device is in an usage status.
Figure 2:
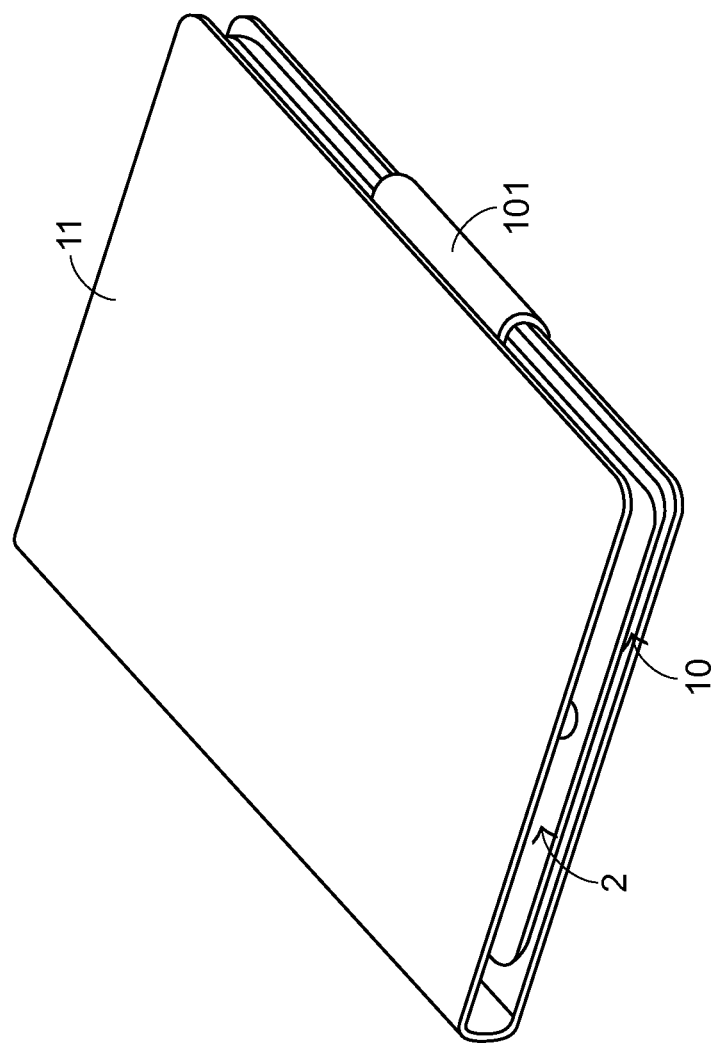
FIG. 2 is a schematic perspective view illustrating a conventional protecting device for a tablet computer, in which the tablet computer is stored within the protecting device.
Figure 3:
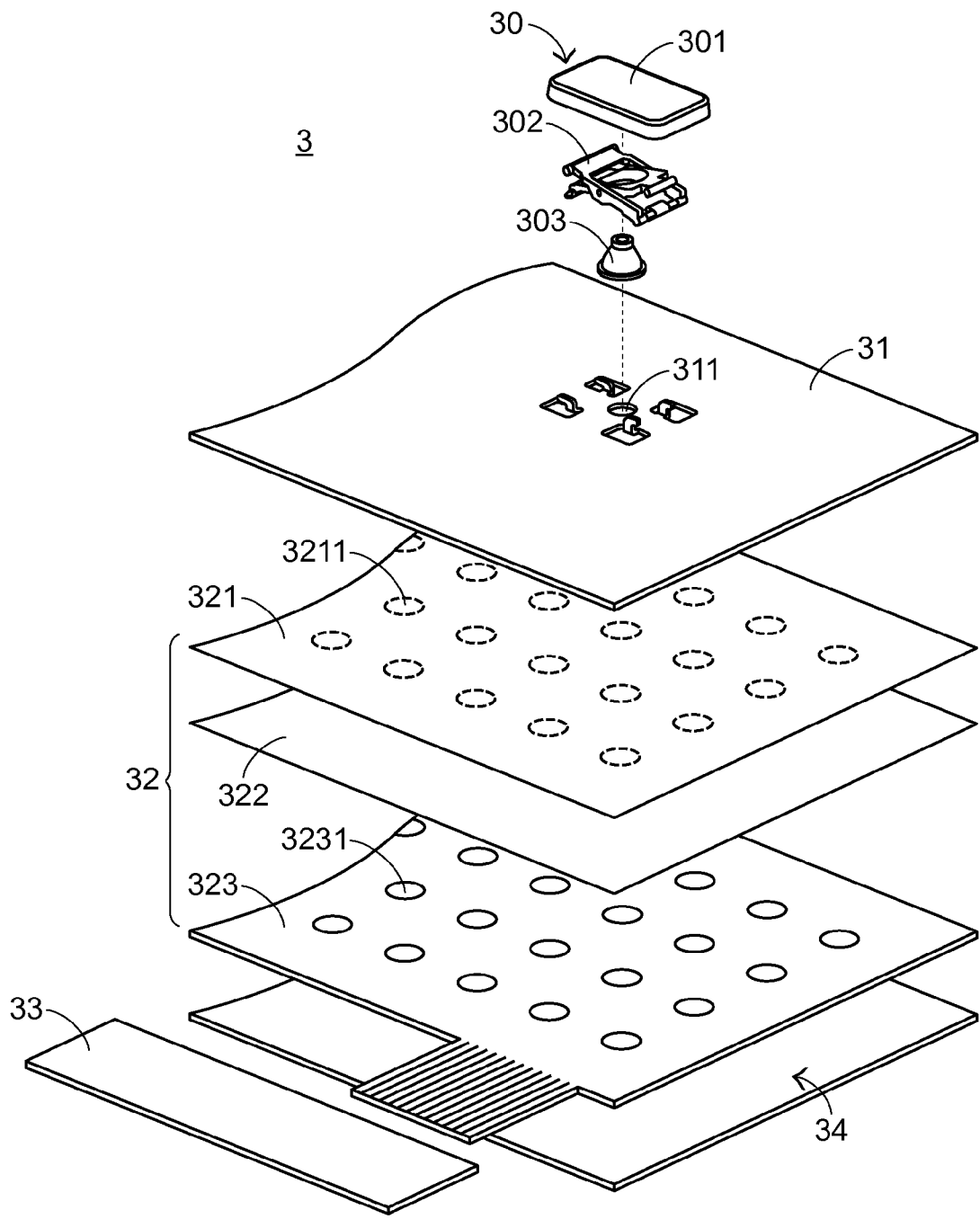
FIG. 3 is a schematic exploded view illustrating the structure of a conventional external keyboard device.
Figure 4:
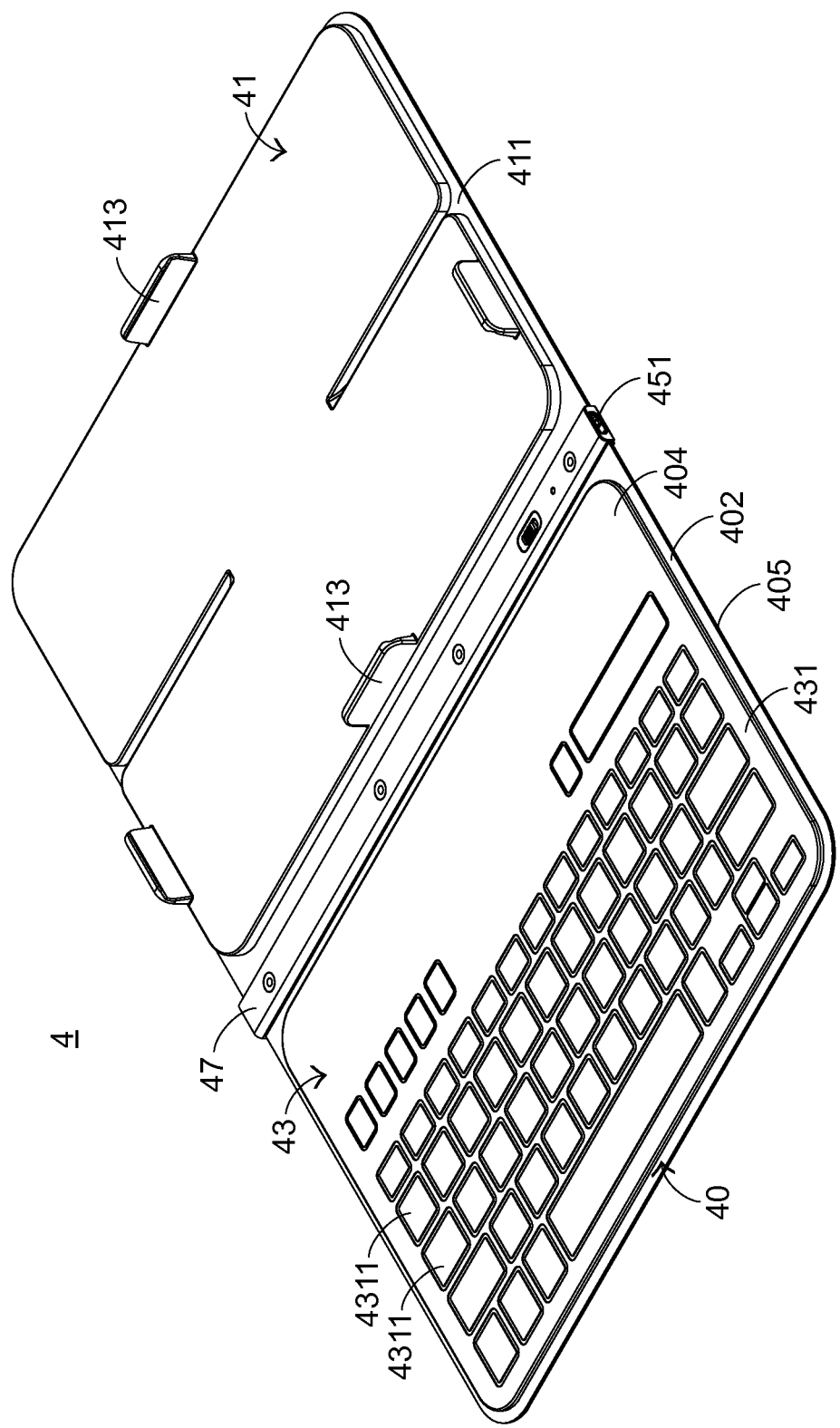
FIG. 4 is a schematic perspective view illustrating a protecting device with keys' functions according to a first embodiment of the present invention.
Figure 5:
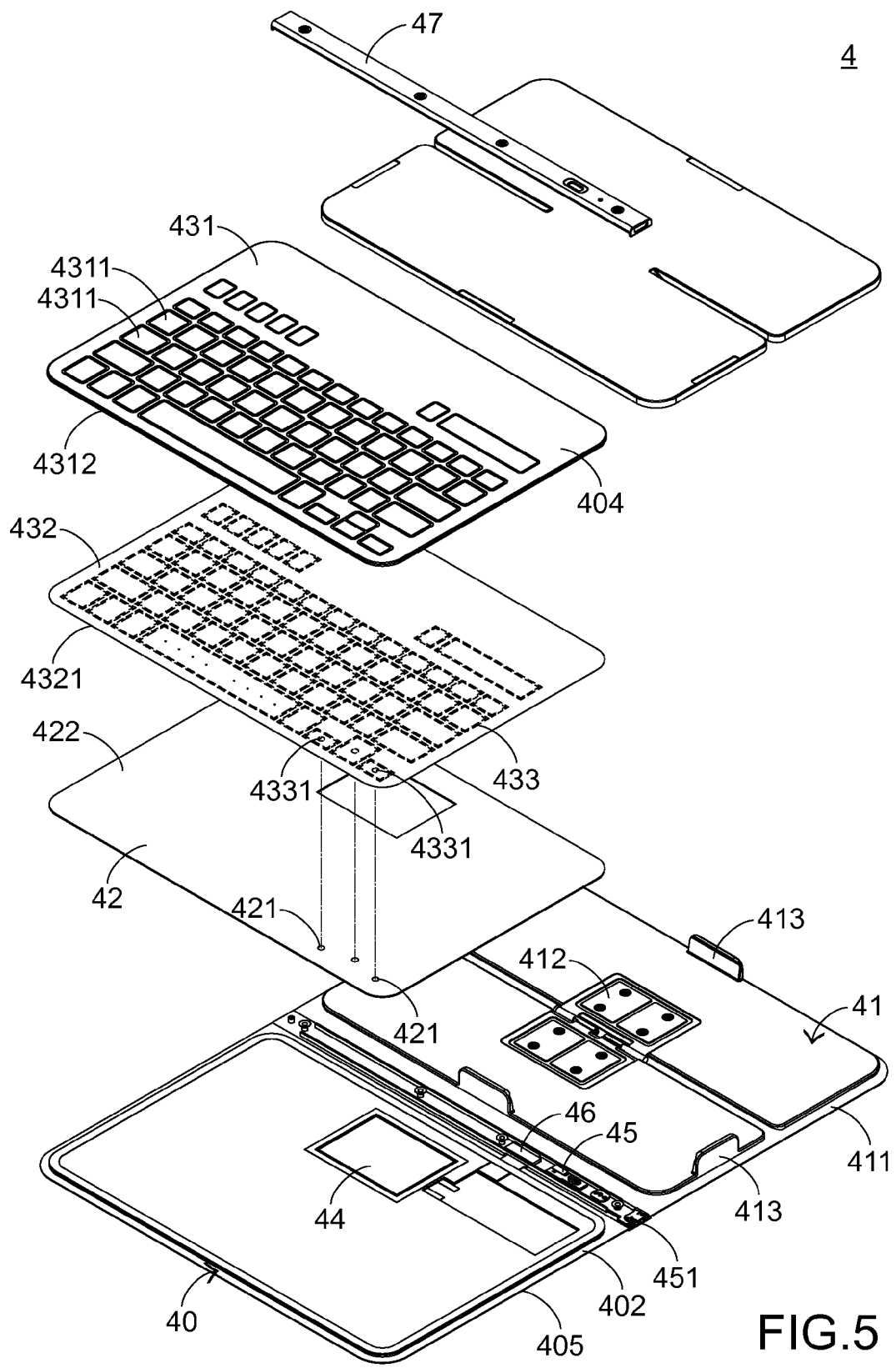
FIG. 5 is a schematic exploded view illustrating the protecting device with the key's function according to the first embodiment of the present invention.

Hereinafter, a protecting device with keys' functions according to a first embodiment will be illustrated with reference to FIGS. 4 and 5. FIG. 4 is a schematic perspective view illustrating a protecting device with keys' functions according to a first embodiment of the present invention. FIG. 5 is a schematic exploded view illustrating the protecting device with the key's functions according to the first embodiment of the present invention. The protecting device 4 is in communication with a tablet computer 5 (see FIG. 7). Moreover, the tablet computer 5 may be stored within the protecting device 4. The protecting device 4 comprises a base 40, an upper cover 41, a printed circuit board 42, a triggering member 43, a chargeable battery 44, a charging module 45, a first wireless transmission module 46, and a protective cover 47. The upper cover 41 is connected with the base 40. The upper cover 41 is rotatable relative to the base 40 in order to cover the triggering member 43. When the triggering member 43 is covered by the upper cover 41, the protecting device 4 is in a storage status. The printed circuit board 42 is disposed over the base 40. In addition, the printed circuit board 42 further comprises plural first contacts 421. For clarification and brevity, only three first contacts 421 are shown in FIG. 5. The plural first contacts 421 are disposed on a top surface 422 of the printed circuit board 42. The triggering member 43 is disposed over the printed circuit board 42, and exposed to an inner surface 404 of the protecting device 4. The triggering member 43 and the plural first contacts 421 of the printed circuit board 42 may collaboratively generate plural key signals.

The chargeable battery 44 is disposed on the base 40 and connected with the printed circuit board 42. The chargeable battery 44 may provide an electric power to the printed circuit board 42. The charging module 45 is disposed on the base 40 and connected with the chargeable battery 44 in order to charge the chargeable battery 44. Moreover, the charging module 45 has a connecting hole 451. An end of a connecting wire (not shown) may be plugged into the connecting hole 451. Another end of the connecting wire is connected with a power source (not shown). Consequently, the electric power from the power source may be acquired by the charging module 45 through the connecting wire and transmitted to the chargeable battery 44. The first wireless transmission module 46 is disposed on the base 40 and connected with the chargeable battery 44. By a wireless transmission technology, the plural key signals may be transmitted to the tablet computer 5 through the first wireless transmission module 46. The first wireless transmission module 46 may be powered by the electric power of the chargeable battery 44. The protective cover 47 is disposed on the base 40. Moreover, the charging module 45 and the first wireless transmission module 46 are covered by the protective cover 47. Consequently, the charging module 45 and the first wireless transmission module 46 are protected by the protective cover 47.

Figure 7:
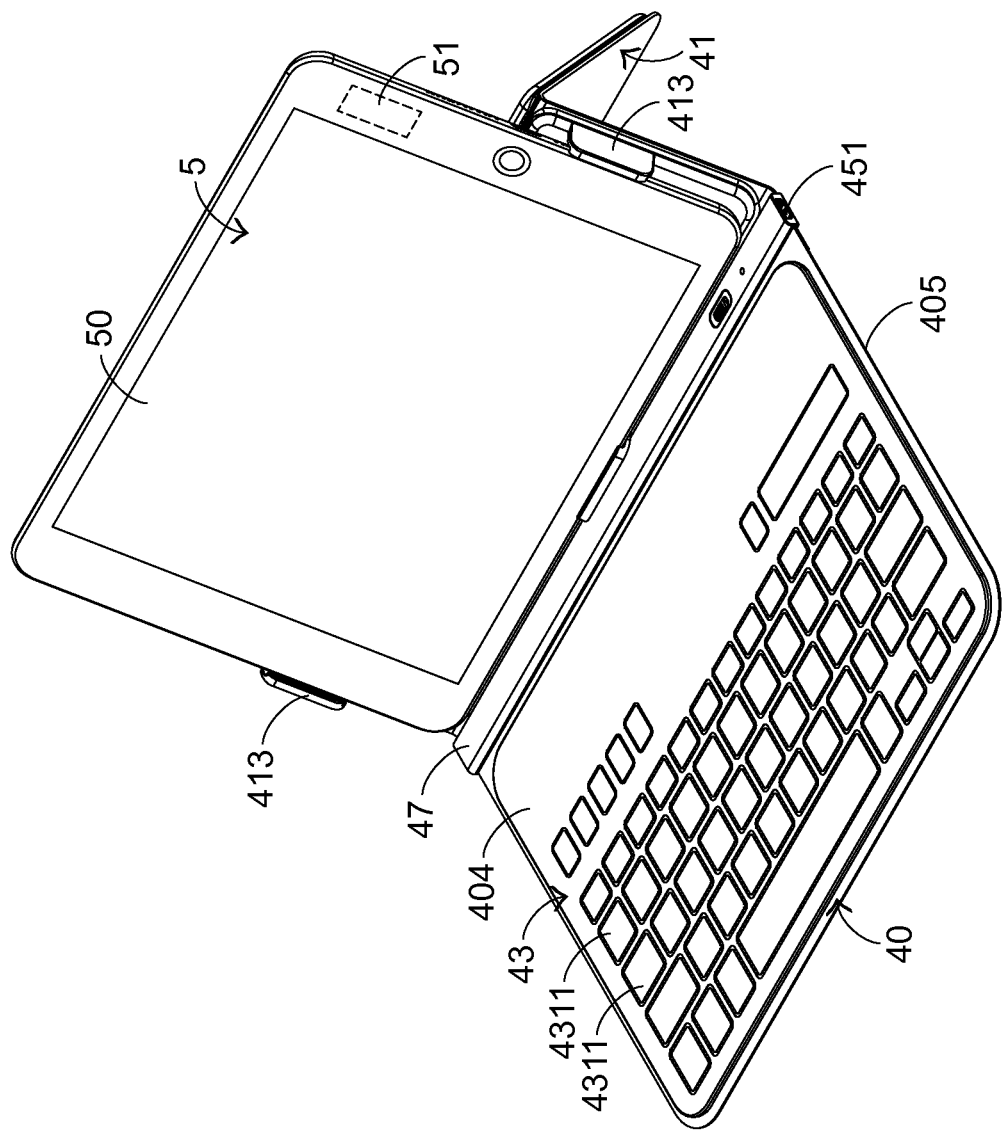
FIG. 7 is a schematic perspective view illustrating the protecting device according to the first embodiment of the present invention, in which the protecting device is in a usage status.

FIG. 7 is a schematic perspective view illustrating the protecting device according to the first embodiment of the present invention, in which the protecting device is in a usage status. The tablet computer 5 comprises a display screen 50 and a second wireless transmission module 51. The display screen 50 is exposed outside the tablet computer 5 for displaying an image. Moreover, in response to a user's operation, the display screen 50 may generate a touch signal. The second wireless transmission module 51 is disposed within the tablet computer 5. By a wireless transmission technology, the second wireless transmission module 51 is in communication with the first wireless transmission module 46. Consequently, the plural key signals from the protecting device 4 may be transmitted to the second wireless transmission module 51.

In this embodiment, both of the first wireless transmission module 46 and the second wireless transmission module 51 are Bluetooth transmission module, the connecting hole 451 is a mini universal serial bus (Mini USB) interface, and the display screen 50 is a touch screen. The examples of these components are not restricted. Alternatively, in some other embodiments, both of the first wireless transmission module 46 and the second wireless transmission module 51 are infrared transmission module or a near field communication (NFC) module, and the connecting hole is a USB interface or any other appropriate communication interface.

Figure 6:
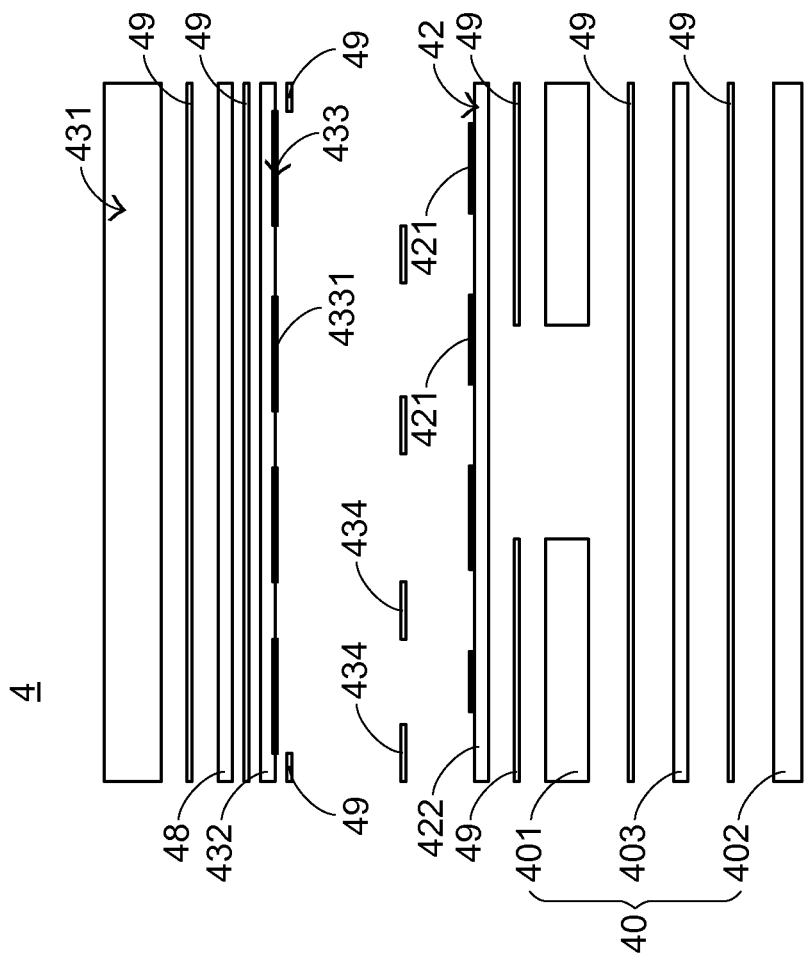
FIG. 6 is a schematic exploded and cross-sectional view illustrating the protecting device according to the first embodiment of the present invention.

Hereinafter, the detailed configurations of the triggering member 43 will be illustrated with reference to FIGS. 5 and 6. FIG. 6 is a schematic exploded and cross-sectional view illustrating the protecting device according to the first embodiment of the present invention. As shown in FIGS. 5 and 6, the triggering member 43 comprises a superficial contact layer 431, a first plastic film layer 432, a conductive wiring layer 433, and plural curable resinic structures 434. The superficial contact layer 431 is exposed to the inner surface 404 of the protecting device 4. Moreover, the superficial contact layer 431 comprises plural contact regions 4311. The plural contact regions 4311 are disposed over the corresponding first contacts 421, respectively. The first plastic film layer 432 is disposed on a bottom surface 4312 of the superficial contact layer 431. The conductive wiring layer 433 is disposed on a bottom surface 4321 of the first plastic film layer 432. Moreover, the conductive wiring layer 433 comprises plural second contacts 4331. For clarification and brevity, only three second contacts 4331 are shown in FIG. 5. The plural second contacts 4331 are aligned with the plural contact regions 4311, respectively. The plural curable resinic structures 434 are arranged between the first plastic film layer 432 and the printed circuit board 42. Each of the plural curable resinic structures 434 is arranged between two adjacent second contacts 4331 and located beside the corresponding second contacts 4331. The plural first contacts 421 and the plural second contacts 4331 are separated from each other by the plural curable resinic structures 434. Consequently, if the contact regions 4311 are not depressed, the first contacts 421 and the corresponding second contacts 4331 will not be erroneously contacted with each other. Moreover, when one of the contact regions 4311 is depressed, the corresponding first contact 421, the corresponding curable resinic structures 434 and the corresponding second contact 4331 may collaboratively generate the corresponding key signal. In other words, the first contacts 421, the curable resinic structures 434 and the second contacts 4331 of the protecting device 4 may replace the upper contacts, the spacer layer and the lower contacts of the conventional membrane switch circuit module. Moreover, the plural contact regions 4311 of the protecting device 4 may replace the keycaps, the scissors-type connecting elements and the elastic elements of the conventional external keyboard device.

Moreover, the protecting device 4 of this embodiment further comprises a second plastic film layer 48. The second plastic film layer 48 is arranged between the superficial contact layer 431 and the first plastic film layer 432. The superficial contact layer 431 may be flattened by the second plastic film layer 48. In this embodiment, the superficial contact layer 431 is made of synthetic leather and has a thickness of 0.4 mm to 0.6 mm. Moreover, the superficial contact layer 431 and the first plastic film layer 432 are bonded together through glue 49. The conductive wiring layer 433 is formed on the bottom surface 4321 of the first plastic film layer 432 by a printing technology. The printed circuit board 42 and the base 40 are also bonded together through glue 49. Moreover, the plural first contacts 421 are plural copper foil structures, which are distributed on the top surface of the printed circuit board 42. Similarly, the second plastic film layer 48 and the superficial contact layer 431 are bonded together through glue 49, and the second plastic film layer 48 and the first plastic film layer 432 are bonded together through glue 49. The plural curable resinic structures 434 are attached on the bottom surface 4321 of the first plastic film layer 432 by a curing technology. The curable resinic structures 434 are made of UV curable adhesive.

Hereinafter, the detailed configurations of the base 40 will be illustrated with reference to FIGS. 5 and 6. The base 40 comprises a supporting plate 401, a first protective plate 402, and a third plastic film layer 403. The supporting plate 401 is disposed under the printed circuit board 42 for supporting the printed circuit board 42 in order to avoid damage of the printed circuit board 42. The first protective plate 402 is disposed under the supporting plate 401 and exposed to an outer surface 405 of the protecting device 4. The first protective plate 402 may support the triggering member 43 and the printed circuit board 42 and protect the triggering member 43 and the printed circuit board 42. The third plastic film layer 403 is arranged between the first protective plate 402 and the supporting plate 401. The first protective plate 402 may be flattened by the third plastic film layer 403. In this embodiment, the first protective plate 402 is made of synthetic leather and has a thickness of 0.4 mm to 0.6 mm. Moreover, the first protective plate 402 and the third plastic film layer 403 are bonded together through glue 49, and the supporting plate 401 and the third plastic film layer 403 are also bonded together through glue 49.

Hereinafter, the detailed configurations of the upper cover 41 will be illustrated with reference to FIGS. 5 and 6. The upper cover 41 comprises a second protective plate 411, a bending structure 412, and plural fixing elements 413. The second protective plate 411 is connected with the first protective plate 402 of the base 40 for supporting the tablet computer 5. Moreover, the second protective plate 411 is rotatable relative to the first protective plate 402 in order to cover the triggering member 43. The bending structure 412 is disposed on the second protective plate 411. The bending structure 412 is used for bending the second protective plate 411. After the second protective plate 411 is bent, the exterior shape of the upper cover 41 is changed, and thus the tablet computer 5 may be supported by the upper cover 41. The plural fixing elements 413 are disposed on the second protective plate 411 and exposed outside the second protective plate 411. Moreover, the plural fixing elements 413 are used for fixing the tablet computer 5 on the upper cover 41.

In this embodiment, the second protective plate 411 is made of synthetic leather and has a thickness of 0.4 mm to 0.6 mm. More preferably, the second protective plate 411 is integrally formed with the first protective plate 402. The bending structure 412 comprises two metal sheets and a rotating shaft. The two metal sheets may be rotated relative to the rotating shaft, so that the exterior shape of the upper cover 41 is changeable. The fixing elements 413 are locking elements, but are not limited thereto. Alternatively, in some other embodiments, the first protective plate and the second protective plate are separate components, the bending structure is made of a non-metallic material, and the fixing elements are other appropriate fixing structures for achieving the fixing function.

Hereinafter, a method of using the protecting device 4 to operate the tablet computer 5 will be illustrated with reference to FIGS. 6 and 7. Before the tablet computer 5 is operated, the tablet computer 5 is fixed on the upper cover 41 through the plural fixing elements 413. After the tablet computer 5 is fixed on the upper cover 41, the user may rotate the upper cover 41. As the upper cover 41 is rotated, the bending structure 412 is correspondingly bent. Under this circumstance, the upper cover 41 is subjected to deformation, and the protecting device 4 is in a usage status as shown in FIG. 7. In the usage status, the operations of the protecting device 4 are similar to those of the conventional notebook computer. Consequently, the user may depress the plural contact regions 4311 of the triggering member 43 to generate the plural key signals according to the usual practice of operating a computer.

When one of the plural contact regions 4311 is depressed by the user, in response to the depressing force provided by the user, the contact region 4311 is subjected to slight deformation because the superficial contact layer 431 is made of synthetic leather. Consequently, the first plastic film layer 432 under the superficial contact layer 431 is correspondingly protruded toward the base 40 in a downward direction. Meanwhile, the second contact 4331 corresponding to the depressed contact region 4311 is inserted into the space between the two adjacent curable resinic structures 434 and contacted with the corresponding first contact 421. Under this circumstance, the electrical connection between the first contact 421 and the second contact 4331 is established, and a corresponding key signal is generated. The key signal is transmitted to the second wireless transmission module 51 of the tablet computer 5 through the first wireless transmission module 46. Consequently, the tablet computer 5 executes an instruction corresponding to the key signal. On the other hand, when the contact region 4311 is no longer depressed by the user, the downwardly protruded contact region 4311 is restored to its original shape because the synthetic leather has a restorable property.

Figure 8:
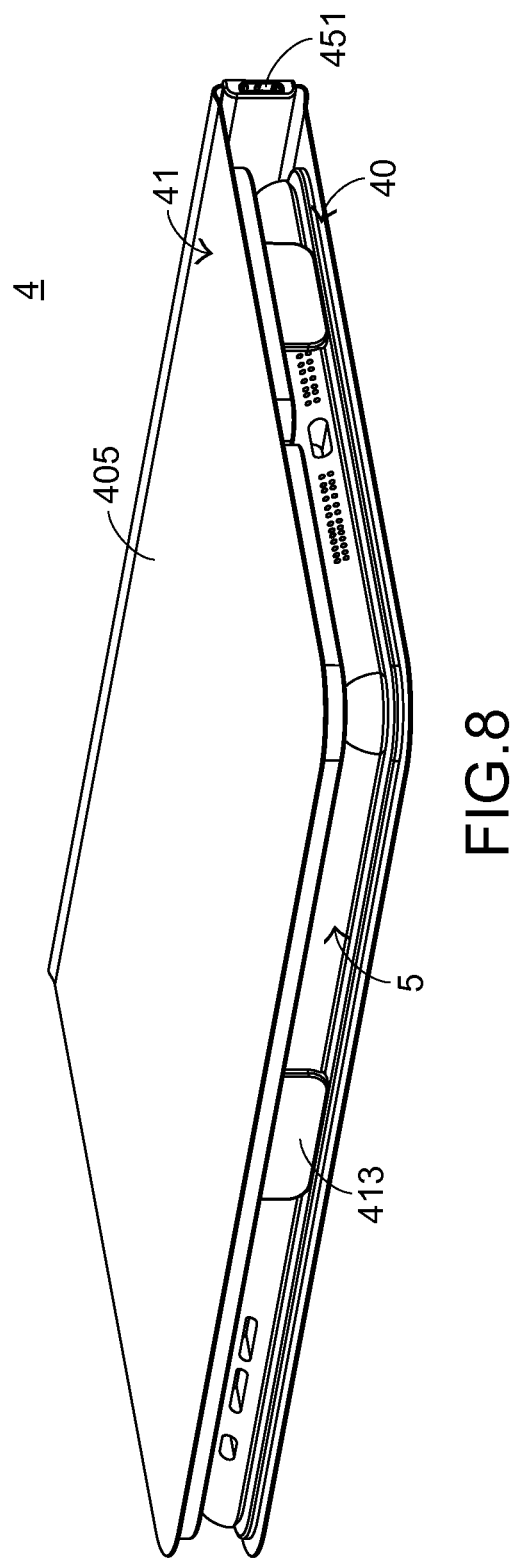
FIG. 8 is a schematic perspective view illustrating the protecting device according to the first embodiment of the present invention, in which the protecting device is in a storage status.

Moreover, when the tablet computer 5 is no longer used, the user may rotate the upper cover 41 toward the superficial contact layer 431. Consequently, the upper cover 41 and the tablet computer 5 fixed on the upper cover 41 may cover a top surface of the superficial contact layer 431 (i.e. the inner surface 404 of the protecting device 4). Under this circumstance, the protecting device 4 is in a storage status as shown in FIG. 8. In the storage status, the protecting device 4 may be held and carried by the user more easily.

Hereinafter, the following two aspects will be specially illustrated. Firstly, the superficial contact layer 431 of the triggering member 43 of the protecting device 4 has a thickness of about 0.4 mm to 0.6 mm. The total thickness of the first plastic film layer 432 and the conductive wiring layer 433 is about 0.15 mm. The thickness of the second plastic film layer 48 is about 0.1 mm. The thickness of each curable resinic structure 434 is about 0.2 mm. The thickness of the printed circuit board 42 is about 0.5 mm. In the base 40, the thickness of the supporting plate 401 is about 0.5 mm, the thickness of the first protective plate 402 is about 0.4 mm to 0.6 mm, and the thickness of the third plastic film layer 403 is about 0.1 mm. Moreover, the thickness of the glue 49 is about 0.025 mm to 0.05 mm. In other words, the total thickness of the protecting device 4 is about 3.2 mm. In comparison with the external keyboard device with the total thickness of 4 mm to 6 mm, the total thickness of the protecting device 4 is largely reduced and the total weight thereof is reduced.

Secondly, the second plastic film layer 48 is arranged between the superficial contact layer 431 and the first plastic film layer 432 in order to maintain the flatness of the superficial contact layer 431; and the third plastic film layer 403 is arranged between the first protective plate 402 and the supporting plate 401 in order to maintain the flatness of the first protective plate 402. Alternatively, in some other embodiments, the second plastic film layer and the third plastic film layer are omitted. Under this circumstance, the flatness of the protecting device is slightly deteriorated. However, since the total thickness of the protecting device is further reduced, the protecting device is lighter and thinner.

Figure 9:
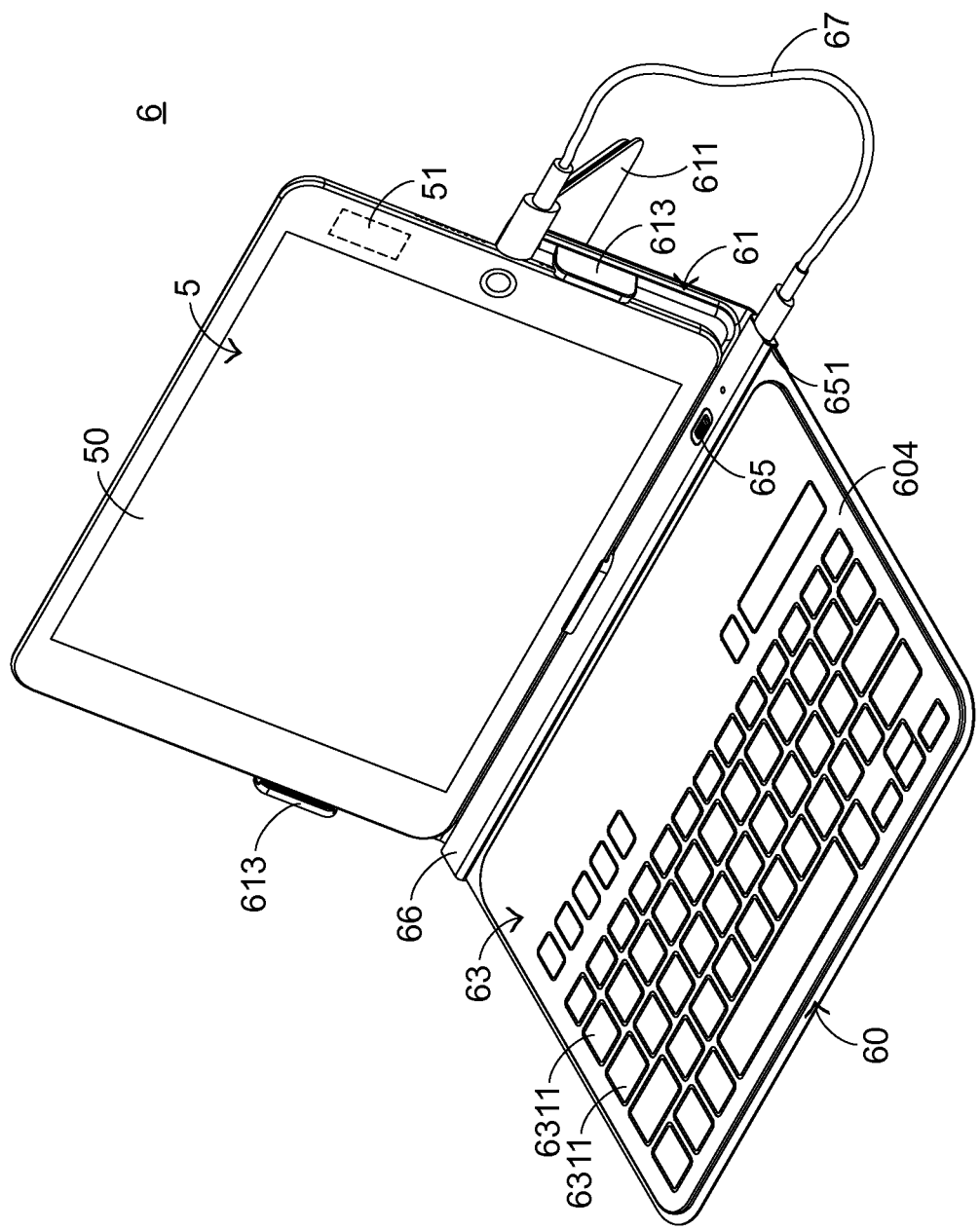
FIG. 9 is a schematic perspective view illustrating a protecting device with keys' functions according to a second embodiment of the present invention.
Figure 10:
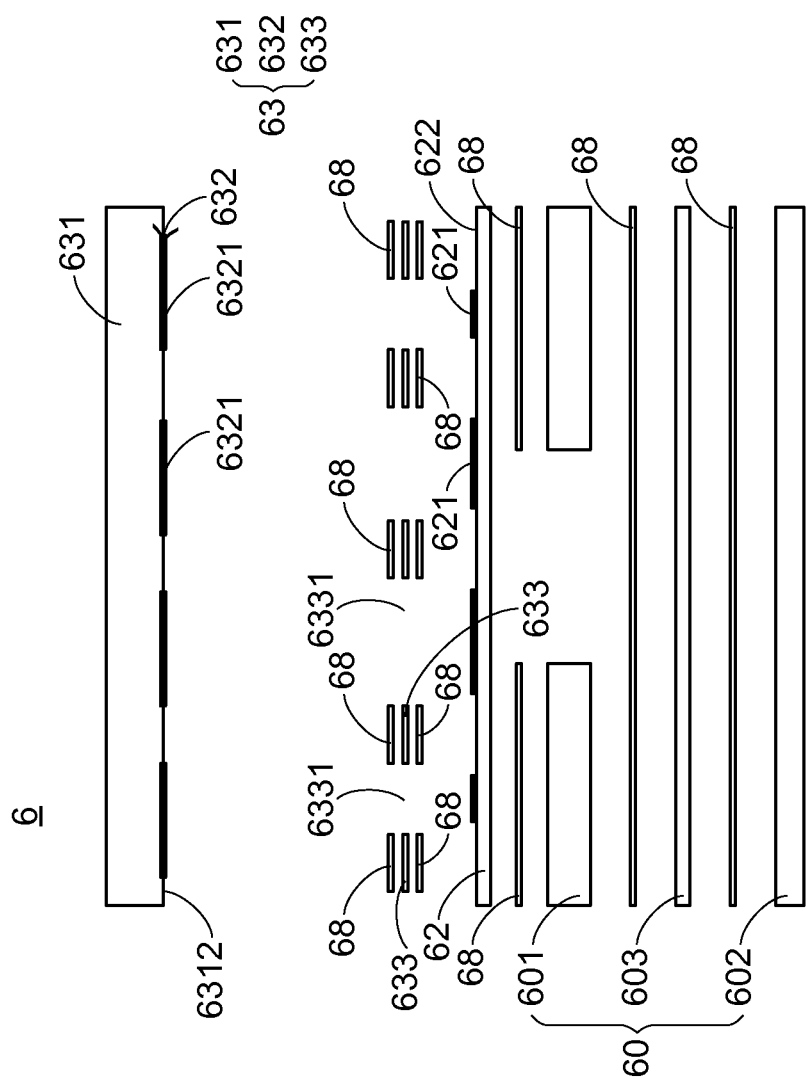
FIG. 10 is a schematic exploded and cross-sectional view illustrating the protecting device according to the second embodiment of the present invention, in which the protecting device is in a usage status.

The present invention further provides a second embodiment. FIG. 9 is a schematic perspective view illustrating a protecting device with keys' functions according to a second embodiment of the present invention. FIG. 10 is a schematic exploded and cross-sectional view illustrating the protecting device according to the second embodiment of the present invention, in which the protecting device is in a usage status. As shown in FIGS. 9 and 10, the protecting device 6 comprises a base 60, an upper cover 61, a printed circuit board 62 with plural first contacts 621, a triggering member 63, a chargeable battery (not shown), a charging module 65, a first wireless transmission module (not shown), a protective cover 66, and a connecting wire 67. The base 60 comprises a supporting plate 601, a first protective plate 602, and a second plastic film layer 603. The upper cover 61 comprises a second protective plate 611, a bending structure (not shown), and plural fixing elements 613. Except for the configurations of the triggering member 63, the configurations and the functions of the protecting device 6 of this embodiment are substantially identical to those of the protecting device 4 of the first embodiment. The detailed descriptions of the identical components will be omitted herein.

Hereinafter, the detailed configurations of the triggering member 63 will be illustrated with reference to FIG. 10. The triggering member 63 comprises a superficial contact layer 631, a conductive wiring layer 632, and a first plastic film layer 633. The superficial contact layer 631 is exposed to an inner surface 604 of the protecting device 6. Moreover, the superficial contact layer 631 comprises plural contact regions 6311. The plural contact regions 6311 are aligned with respective first contacts 621 and disposed over respective first contacts 621. The conductive wiring layer 632 is disposed on a bottom surface 6312 of the superficial contact layer 631. The conductive wiring layer 632 comprises plural second contacts 6321. The plural second contacts 6321 are aligned with respective contact regions 6311 and respective first contacts 621. The first plastic film layer 633 is arranged between the superficial contact layer 631 and the printed circuit board 62, and located beside the plural second contacts 6321. The first plastic film layer 633 comprises plural perforations 6331. The plural perforations 6331 are aligned with the plural first contacts 621, respectively. The plural first contacts 621 and the plural second contacts 6321 are separated from each other by the first plastic film layer 633. In this embodiment, the superficial contact layer 631 is made of synthetic leather and has a thickness of 0.4 mm to 0.6 mm. The conductive wiring layer 632 is formed on the bottom surface 6312 of the superficial contact layer 631 by a printing technology. The superficial contact layer 631 and the first plastic film layer 633 are bonded together through glue 68.

A method of using the protecting device 6 to operate the tablet computer 5 will be illustrated as follows. When one of the plural contact regions 6311 is depressed by the user, in response to the depressing force provided by the user, the contact region 6311 is subjected to slight deformation because the superficial contact layer 631 is made of synthetic leather. That is, the depressed contact region 6311 is correspondingly protruded toward the base 60 in a downward direction. Meanwhile, the second contact 6321 corresponding to the depressed contact region 6311 is inserted into the corresponding perforation 6331 and contacted with the corresponding first contact 621. Under this circumstance, the electrical connection between the first contact 621 and the second contact 6321 is established, and a corresponding key signal is generated. The key signal is transmitted to the tablet computer 5 through the first wireless transmission module. On the other hand, when the contact region 6311 is no longer depressed by the user, the downwardly-protruded contact region 6311 is restored to its original shape because the synthetic leather has a restorable property.

Hereinafter, the following two aspects will be specially illustrated. Firstly, in comparison with the first embodiment, the triggering member 63 of this embodiment comprises a single plastic film layer 633 (i.e. the first plastic film layer 633) and is not equipped with the curable resinic structures. Under this circumstance, since the amount of glue 68 is reduced, the total thickness of the protecting device 6 is further reduced. For example, the total thickness of the protecting device 6 is about 2.7 mm. Secondly, as shown in FIG. 9, an end of the connecting wire 67 is plugged into a connecting hole 651 of the charging module 65, and another end of the connecting wire 67 is plugged into the tablet computer 5. In case that no power source (e.g. a power bank) is available, the protecting device 6 may be connected with the tablet computer 5 through the connecting wire 67. Consequently, the electric power may be transmitted from the tablet computer 5 to the protecting device 6.

From the above descriptions, the present invention provides a protecting device with keys' functions. The protecting device is a multilayered structure with plural layers in a stack form. The plural first contacts are formed on the printed circuit board. The plural second contacts are formed on the triggering member. The plural curable resinic structures or the first plastic film layer is arranged between the triggering member and the printed circuit board. The plural first contacts and the plural second contacts are separated from each other by the plural curable resinic structures or the first plastic film layer. Since the triggering member and the printed circuit board collaboratively generate plural key signals, the protecting device has the keys' functions. In other words, the triggering member, the printed circuit board and the plural curable resinic structures or the first plastic film layer of the protecting device of the present invention may replace the keycaps, the scissors-type connecting elements, the elastic elements upper contacts, the supporting plate and the conventional membrane switch circuit module of the conventional external keyboard device. In comparison with the conventional external keyboard device, the protecting device of the present invention is thinner and lighter. Consequently, the protecting device can be operated and carried more easily.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A protecting device with keys' functions, the protecting device being in communication with a tablet computer, the tablet computer being storable within the protecting device, the protecting device comprising:
    a base;
    a printed circuit board disposed over the base, wherein the printed circuit board comprises plural first contacts, and the plural first contacts are disposed on a top surface of the printed circuit board; and
    a triggering member disposed over the printed circuit board and exposed to an inner surface of the protecting device, wherein the triggering member and the plural first contacts of the printed circuit board collaboratively generate plural key signals, wherein the triggering member comprises:
        a superficial contact layer exposed to the inner surface of the protecting device, and comprising plural contact regions, wherein the plural contact regions are disposed over the corresponding first contacts, respectively;
        a first plastic film layer disposed on a bottom surface of the superficial contact layer;
        a conductive wiring layer disposed on a bottom surface of the first plastic film layer, and comprising plural second contacts, wherein the plural second contacts are aligned with the plural contact regions, respectively; and
        plural curable resinic structures arranged between the first plastic film layer and the printed circuit board, wherein each of the plural curable resinic structures is arranged between two adjacent second contacts, wherein the plural first contacts and the plural second contacts are separated from each other by the plural curable resinic structures, wherein when one of the plural contact regions is depressed, the second contact corresponding to the depressed contact region is inserted into a space between the two adjacent curable resinic structures and contacted with the corresponding first contact, so that the corresponding key signal is generated and transmitted to the tablet computer.

2. The protecting device according to claim 1, wherein the superficial contact layer is made of synthetic leather and has a thickness of 0.4 mm to 0.6 mm, wherein the superficial contact layer and the first plastic film layer are bonded together through glue, and the printed circuit board and the base are bonded together through glue, wherein the plural first contacts are plural copper foil structures that are distributed on the top surface of the printed circuit board, and the plural curable resinic structures are attached on the bottom surface of the first plastic film layer by a curing technology.

3. The protecting device according to claim 1, further comprising a second plastic film layer, wherein the second plastic film layer is arranged between the superficial contact layer and the first plastic film layer, and the superficial contact layer is flattened by the second plastic film layer, wherein the second plastic film layer and the superficial contact layer are bonded together through glue, and the second plastic film layer and the first plastic film layer are bonded together through glue.

4. The protecting device according to claim 1, wherein the base comprises:
    a supporting plate disposed under the printed circuit board, wherein the printed circuit board is supported by the supporting plate;
    a first protective plate disposed under the supporting plate and exposed to an outer surface of the protecting device, wherein the triggering member and the printed circuit board are supported and protected by the first protective plate; and
    a third plastic film layer arranged between the first protective plate and the supporting plate, wherein the first protective plate is flattened by the third plastic film layer.

5. The protecting device according to claim 4, wherein the first protective plate is made of synthetic leather and has a thickness of 0.4 mm to 0.6 mm, wherein the first protective plate and the third plastic film layer are bonded together through glue, and the supporting plate and the third plastic film layer are bonded together through glue.

6. The protecting device according to claim 1, further comprising:
    an upper cover connected with the base and rotatable relative to the base so as to cover the triggering member, wherein the upper cover comprises a second protective plate, a bending structure and plural fixing elements, wherein the second protective plate is connected with a first protective plate of the base and supports the tablet computer, and the second protective plate is rotatable relative to the first protective plate so as to cover the triggering member, wherein the bending structure is disposed on the second protective plate, and the second protective plate is bent by the bending structure so as to support the tablet computer, wherein the plural fixing elements are disposed on the second protective plate and exposed outside the second protective plate, and the tablet computer is fixed on the upper cover by the plural fixing elements;
    a chargeable battery disposed on the base and connected with the printed circuit board, and providing an electric power to the printed circuit board;
    a charging module disposed on the base and connected with the chargeable battery, wherein the chargeable battery is charged by the charging module; and
    a wireless transmission module disposed on the base and connected with the chargeable battery, wherein the plural key signals are transmitted to the tablet computer by a wireless transmission technology.

7. A protecting device with keys' functions, the protecting device being in communication with a tablet computer, the tablet computer being storable within the protecting device, the protecting device comprising:
    a base;
    a printed circuit board disposed over the base, wherein the printed circuit board comprises plural first contacts, and the plural first contacts are disposed on a top surface of the printed circuit board; and a triggering member disposed over the printed circuit board and exposed to an inner surface of the protecting device, wherein the triggering member and the plural first contacts of the printed circuit board collaboratively generate plural key signals, wherein the triggering member comprises:

a superficial contact layer exposed to the inner surface of the protecting device, and comprising plural contact regions, wherein the plural contact regions are disposed over the corresponding first contacts, respectively;

a conductive wiring layer disposed on a bottom surface of the superficial contact layer, and comprising plural second contacts, wherein the plural second contacts are aligned with the plural contact regions, respectively; and a first plastic film layer arranged between the superficial contact layer, and located beside the plural second contacts, wherein the first plastic film layer comprises plural perforations corresponding to respective first contacts, and the plural first contacts and the plural second contacts are separated from each other by the first plastic film layer, wherein when one of the plural contact regions is depressed, the second contact corresponding to the depressed contact region is inserted into the corresponding perforation and contacted with the corresponding first contact, so that the corresponding key signal is generated and transmitted to the tablet computer.

8. The protecting device according to claim 7, wherein the superficial contact layer is made of synthetic leather and has a thickness of 0.4 mm to 0.6 mm, wherein the superficial contact layer and the first plastic film layer are bonded together through glue, and the printed circuit board and the base are bonded together through glue, the plural first contacts are plural copper foil structures that are distributed on the top surface of the printed circuit board, and the first plastic film layer and the printed circuit board are bonded together through glue.

9. The protecting device according to claim 7, wherein the base comprises:

a supporting plate disposed under the printed circuit board, wherein the printed circuit board is supported by the supporting plate;

a first protective plate disposed under the supporting plate and exposed to an outer surface of the protecting device, wherein the triggering member and the printed circuit board are supported and protected by the first protective plate; and a second plastic film layer arranged between the first protective plate and the supporting plate, wherein the first protective plate is flattened by the second plastic film layer.

10. The protecting device according to claim 9, wherein the first protective plate is made of synthetic leather and has a thickness of 0.4 mm to 0.6 mm, wherein the first protective plate and the second plastic film layer are bonded together through glue, and the supporting plate and the second plastic film layer are bonded together through glue.

11. The protecting device according to claim 7, further comprising:

an upper cover connected with the base and rotatable relative to the base so as to cover the triggering member, wherein the upper cover comprises a second protective plate, a bending structure and plural fixing elements, wherein the second protective plate is connected with a first protective plate of the base and supports the tablet computer, and the second protective plate is rotatable relative to the first protective plate so as to cover the triggering member, wherein the bending structure is disposed on the second protective plate, and the second protective plate is bent by the bending structure so as to support the tablet computer, wherein the plural fixing elements are disposed on the second protective plate and exposed outside the second protective plate, and the tablet computer is fixed on the upper cover by the plural fixing elements;

a chargeable battery disposed on the base and connected with the printed circuit board, and providing an electric power to the printed circuit board;

a charging module disposed on the base and connected with the chargeable battery, wherein the chargeable battery is charged by the charging module; and a wireless transmission module disposed on the base and connected with the chargeable battery, wherein the plural key signals are transmitted to the tablet computer by a wireless transmission technology.

* * * * *